United States Patent
Kanbara et al.

(10) Patent No.: US 8,231,229 B2
(45) Date of Patent: Jul. 31, 2012

(54) TEMPERATURE SENSOR MOUNTING STRUCTURE AND VIDEO PROJECTOR

(75) Inventors: Toshimasa Kanbara, Kishiwada (JP); Taichi Yoshimura, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 279 days.

(21) Appl. No.: 12/630,496

(22) Filed: Dec. 3, 2009

(65) Prior Publication Data
US 2010/0134703 A1 Jun. 3, 2010

(30) Foreign Application Priority Data
Dec. 3, 2008 (JP) ................................. 2008-308833

(51) Int. Cl.
*G03B 21/18* (2006.01)
(52) U.S. Cl. ................ 353/52; 353/53; 353/54; 353/55; 353/56; 353/57; 353/58; 353/59; 353/60; 353/61
(58) Field of Classification Search .................... 353/30, 353/31, 52–61, 119, 122; 349/5, 6, 7, 8, 349/9
See application file for complete search history.

(56) References Cited

U.S. PATENT DOCUMENTS

| | | | |
|---|---|---|---|
| 5,842,761 A * | 12/1998 | Futakami et al. | 353/119 |
| 6,419,364 B2 * | 7/2002 | Takizawa et al. | 353/52 |
| 6,447,121 B1 * | 9/2002 | Woo | 353/52 |
| 6,488,380 B1 * | 12/2002 | Fujimori | 353/119 |
| 7,055,966 B2 * | 6/2006 | Momose et al. | 353/97 |
| 2002/0191158 A1 * | 12/2002 | Koyama et al. | 353/31 |
| 2005/0030483 A1 * | 2/2005 | Kim | 353/52 |
| 2006/0082732 A1 * | 4/2006 | Miwa et al. | 353/57 |
| 2006/0262284 A1 * | 11/2006 | Onishi et al. | 353/99 |
| 2007/0058373 A1 * | 3/2007 | Yoshimura et al. | 362/294 |

FOREIGN PATENT DOCUMENTS
JP 2003-043440 2/2003
* cited by examiner

*Primary Examiner* — Georgia Y Epps
*Assistant Examiner* — Sultan Chowdhury
(74) *Attorney, Agent, or Firm* — Novak Druce + Quigg LLP

(57) ABSTRACT

A mounting structure for a temperature sensor, which detects the temperature of a wall surface. The mounting structure includes a groove formed in the wall surface and having an inlet from which the temperature sensor is inserted. The temperature sensor includes a main body, which has a temperature detection surface that detects the temperature of the wall surface, and a lead wire connected to the main body. A support supports the main body. A wire bender bends the lead wire of the temperature sensor extending out of the inlet to press the temperature detection surface of the temperature sensor against the wall surface with an elastic force of the lead wire that is produced when the lead wire is bent. A stopper restricts movement of the main body of the temperature sensor.

15 Claims, 4 Drawing Sheets

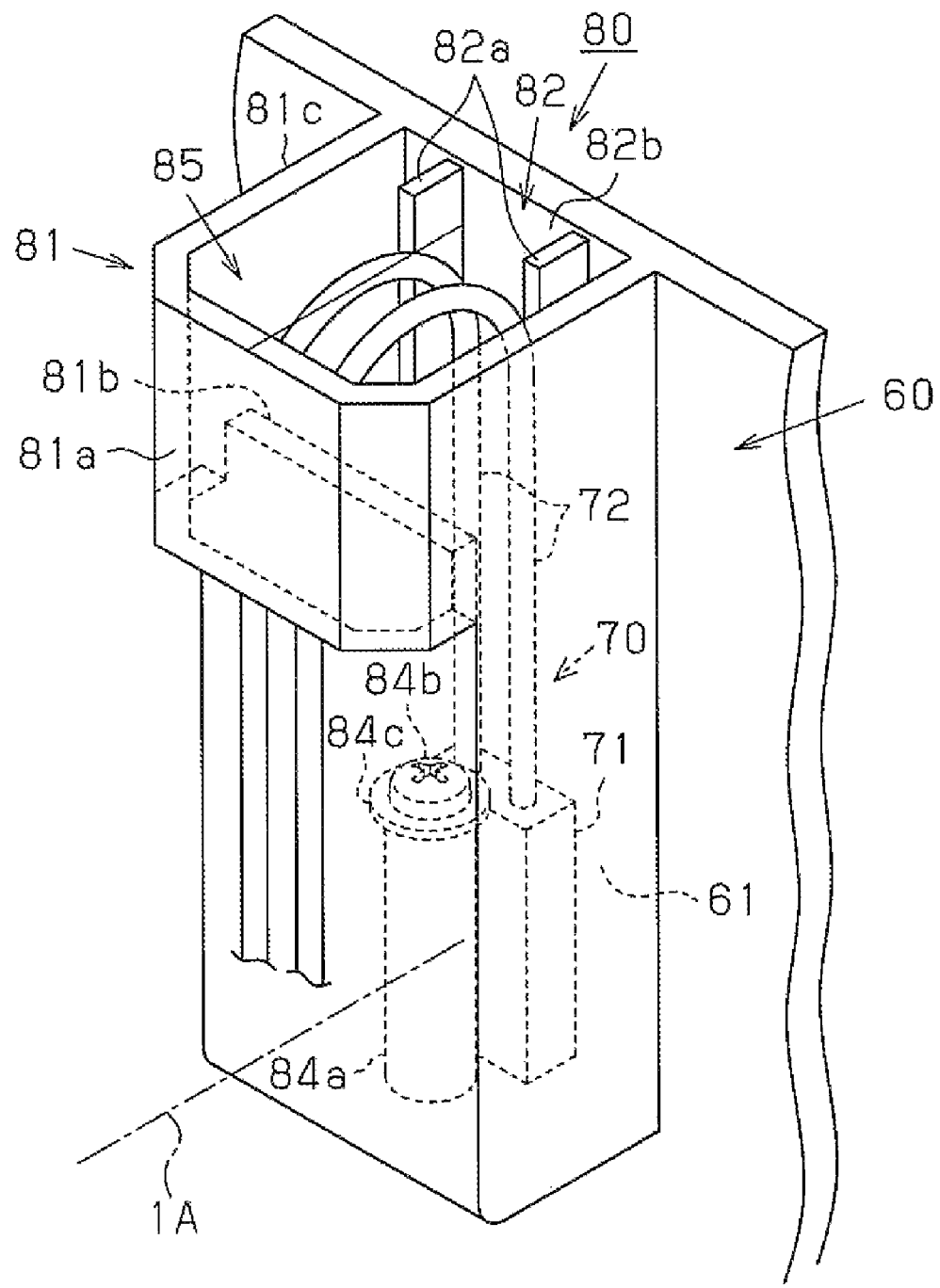

TEMPERATURE SENSOR MOUNTING STRUCTURE AND VIDEO PROJECTOR

CROSS-REFERENCE TO RELATED APPLICATIONS

This application is based upon and claims the benefit of priority from prior Japanese Patent Application No. 2008-308833, filed on Dec. 3, 2008, the entire contents of which are incorporated herein by reference.

BACKGROUND OF THE INVENTION

The present invention relates to a temperature sensor mounting structure, and more particularly, to a structure for mounting a temperature sensor, which detects the temperature of a wall surface, and a video projector to which the structure is applied.

In a video projector using a liquid crystal light bulb, such as a three-panel type liquid crystal projector, a control circuit receives an image signal from a personal computer (PC), video equipment, and the like. The control circuit converts the received image signal to a predetermined voltage and supplies the voltage via signal lines to liquid crystal light bulbs for red light, green light, and blue light. A drive voltage corresponding to the image signal is applied to each pixel for each liquid crystal light bulb to vary the transmissivity of each pixel in accordance with the image signal and modulate the light from a lamp. This generates an image on a screen. A light source that generates a large amount of light, such as metal halide lamp, is normally used as such lamp. Thus, a large amount of power is supplied from a power supply through a power supply line. This heats the lamp to a high temperature.

The radiation or transfer of the heat generated by the lamp raises the temperature of a resin housing, such as a lamp housing that forms an optical path. Further, the liquid crystal in a liquid crystal panel forming the light crystal light bulb and polarization plates arranged at an entrance side and exit side of the liquid crystal panel absorbs light. This raises the temperature of the liquid crystal and polarization plates. Thus, cooling air is supplied to these parts to prevent the temperature from rising. However, if a cooling fan stops operating or an intake port for the cooling air is clogged, the temperature of the resin wall surface of the lamp housing or the polarization plate may exceed a predetermined temperature. To prevent such rise in temperature, a temperature sensor is used to detect the temperature of a wall surface of the lamp housing or a wall surface of a resin polarization plate holder, which holds the polarization plate. Further, when the temperature of these wall surfaces become higher than or equal to a predetermined temperature, a temperature protector stops the supply of power to the lamp and prevents the temperature from rising.

In this manner, temperature sensors, which detect the temperature of a wall surface, are normally arranged at several locations in a video projector that uses liquid crystal light bulbs. Japanese Laid-Open Patent Publication No. 2003-43440 describes a prior art example of a structure for mounting a temperature sensor that detects the wall surface temperature. The structure will now be described with reference to FIG. 1.

FIG. 1 is an exploded perspective view showing a structure in the prior art for mounting a temperature sensor on an entrance side polarization plate holder in a video projector using liquid crystal light bulbs. Referring to FIG. 1, a polarization film 112 is adhered to a transparent base material 111, such as glass, to form a polarization plate 110. The polarization plate 110 is held on a polarization plate holder 120 by a plurality of guide portions 121. A generally U-shaped pressing plate 122 is fitted onto a cutout portion 123 formed in the polarization plate holder 120. The pressing plate 122 restricts the upward movement of the polarization plate holder 120 and has an open lower end that is spread open. In this manner, the polarization plate 110 is mounted on the polarization plate holder 120.

The upper left part of the wall surface on the polarization plate holder 120, as viewed in the drawing, serves as a temperature-detected wall surface, the temperature of which is detected by the main body of a temperature sensor 100. The main body of the temperature sensor 100, which is thin and has the shape of a rectangular plate, includes a temperature detection surface. The main body of the temperature sensor 100 is attached to a sensor fastening plate 130 so that the temperature detection surface of the main body of the temperature sensor 100 is pressed against the surface of the polarization plate holder 120. The sensor fastening plate 130 includes a fastening portion 131 and a mounting portion 132. The fastening portion 131 is fitted onto the main body of the temperature sensor 100 and presses the temperature detection surface on the main body of the temperature sensor 100 against the wall surface of the polarization plate holder 120. The mounting portion 132 is coupled to a tab 124 extending from the polarization plate holder 120. The tab 124 of the polarization plate holder 120 includes a threaded hole 125, and the mounting portion 132 includes a hole 133 aligned with the threaded hole 125. A screw 134 is inserted through the hole 133 and mated with the threaded hole 125 through the hole 133 to mount the temperature sensor 100.

The polarization plate holder 120, to which the polarization plate 110 and the temperature sensor 100 are mounted as described above, is held on an optical box 140 by guides 141. A bent piece 127 including holes 128 extends from the upper end of the polarization plate holder 120. Screws 129 are inserted through the holes 128 of the bent piece 127 and mated with threaded holes 142 formed in the optical box 140 to fasten the polarization plate holder 120 to the optical box 140.

However, in the conventional structure for mounting the temperature sensor, which detects the wall surface temperature, the sensor fastening plate 130, which is a discrete component, is used to press the main body of the small, rectangular plate-shaped temperature sensor 100 against the wall surface of the polarization plate holder 120 that serves as the temperature-detected wall surface. Thus, the mounting of the temperature sensor 100 is difficult. Furthermore, the sensor fastening plate 130, one end of which is fastened to the tab 124, must be elastic to press the small, plate-shaped temperature sensor 100 against the wall surface of the polarization plate holder 120. This makes it difficult to select the appropriate material for the sensor fastening plate 130. More specifically, if the sensor fastening plate 130 was to be formed from an elastic metal plate, heat would be conducted through the sensor fastening plate 130 and thereby lower the accuracy of the temperature detected on the wall surface of the polarization plate holder 120. To avoid such heat conductance, the sensor fastening plate 130 may be formed by a resin molded product. However, the elasticity of the sensor fastening plate 130 would be insufficient and it may be difficult to constantly press the surface of the temperature sensor 100 against the wall surface of the polarization plate holder 120. This would also lower the temperature detection accuracy.

Therefore, it would be desirable to provide a structure for mounting a temperature sensor that facilitates the mounting of the temperature sensor while enabling accurate temperature detection of a temperature-detected wall surface. Further, it would be desirable to provide a video projector using such structure for mounting the temperature sensor.

SUMMARY OF THE INVENTION

One aspect of the present invention is a mounting structure for a temperature sensor, which detects a temperature of a wall surface. The mounting structure is provided with a groove formed in the wall surface and including an inlet from which the temperature sensor is inserted. The temperature sensor includes a main body and a lead wire connected to the main body. The main body includes a temperature detection surface that detects the temperature of the wall surface when in contact with the wall surface. A support supports the main body of the temperature sensor. A wire bender bends the lead wire of the temperature sensor extending out of the inlet into a U-shape so that the lead wire is parallel to the wall surface in order to press the temperature detection surface of the temperature sensor against the wall surface with an elastic force of the lead wire that is produced when the lead wire is bent. A stopper restricts movement of the main body of the temperature sensor towards the inlet.

A further aspect of the present invention is a video projector including a lamp, a liquid crystal light bulb which receives light from the lamp, a housing which houses the lamp, and a mounting unit for a temperature sensor which detects a temperature of a wall surface of the housing. The temperature sensor includes a main body and a lead wire connected to the main body. The main body includes a temperature detection surface, which detects the temperature of the wall surface when in contact with the wall surface. The mounting unit includes a groove formed in the wall surface and includes an inlet from which the temperature sensor is inserted. A support supports the main body of the temperature sensor. A wire bender bends the lead wire of the temperature sensor extending out of the inlet into a U-shape so that the lead wire is parallel to the wall surface in order to press the temperature detection surface of the temperature sensor against the wall surface with an elastic force of the lead wire that is produced when the lead wire is bent. A stopper restricts movement of the main body of the temperature sensor towards the inlet.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a perspective view showing the mounting unit of FIG. 3 and indicating a mounting position for a main body of the temperature sensor and the state of lead wires extending from the temperature sensor.

DETAILED DESCRIPTION OF THE PREFERRED EMBODIMENTS

Figure 1:
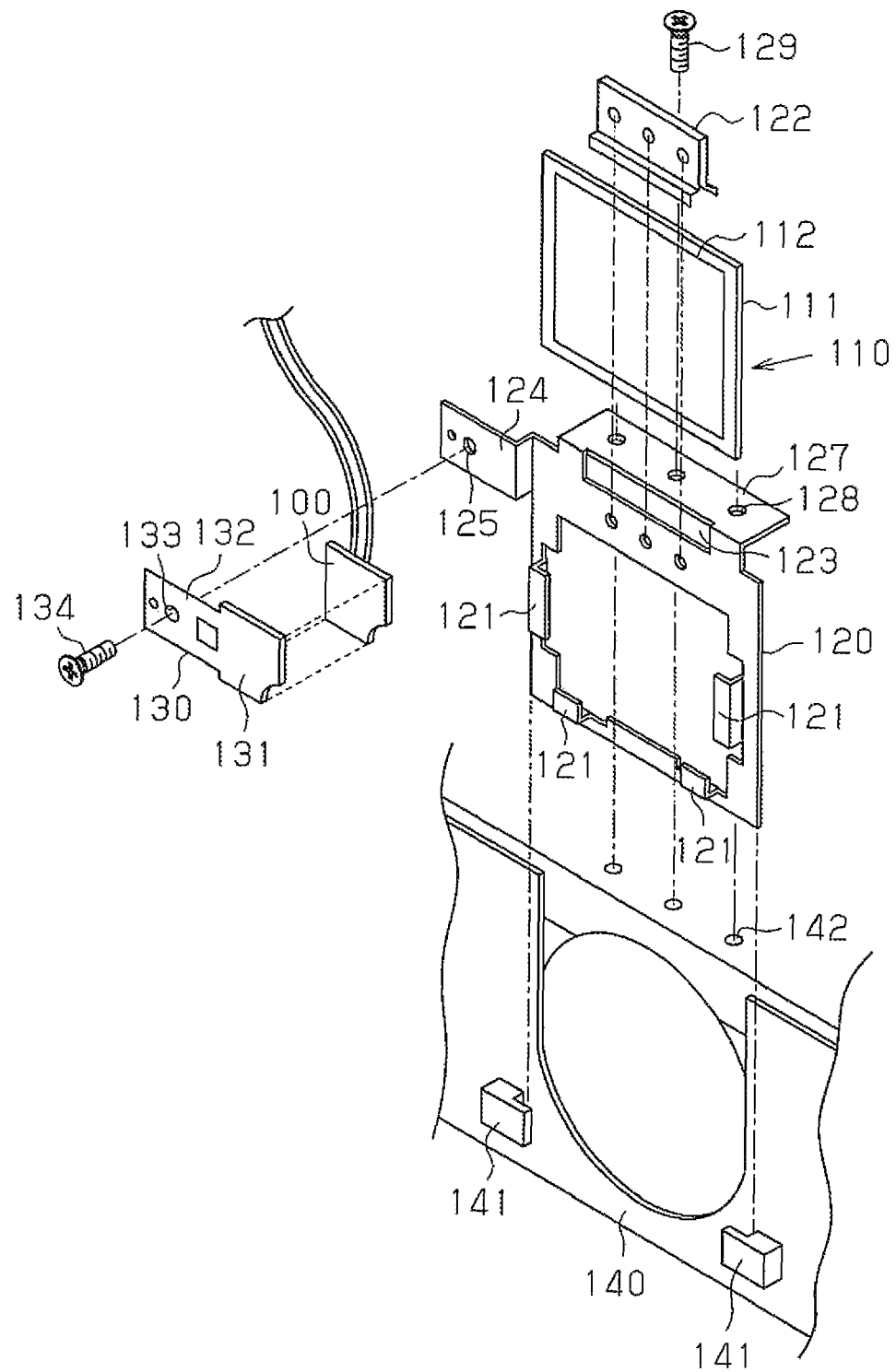
FIG. 1 is an exploded perspective view showing a structure for mounting a temperature sensor, which is fastened to a polarization plate holder on an entrance side in a conventional video projector.
Figure 2:
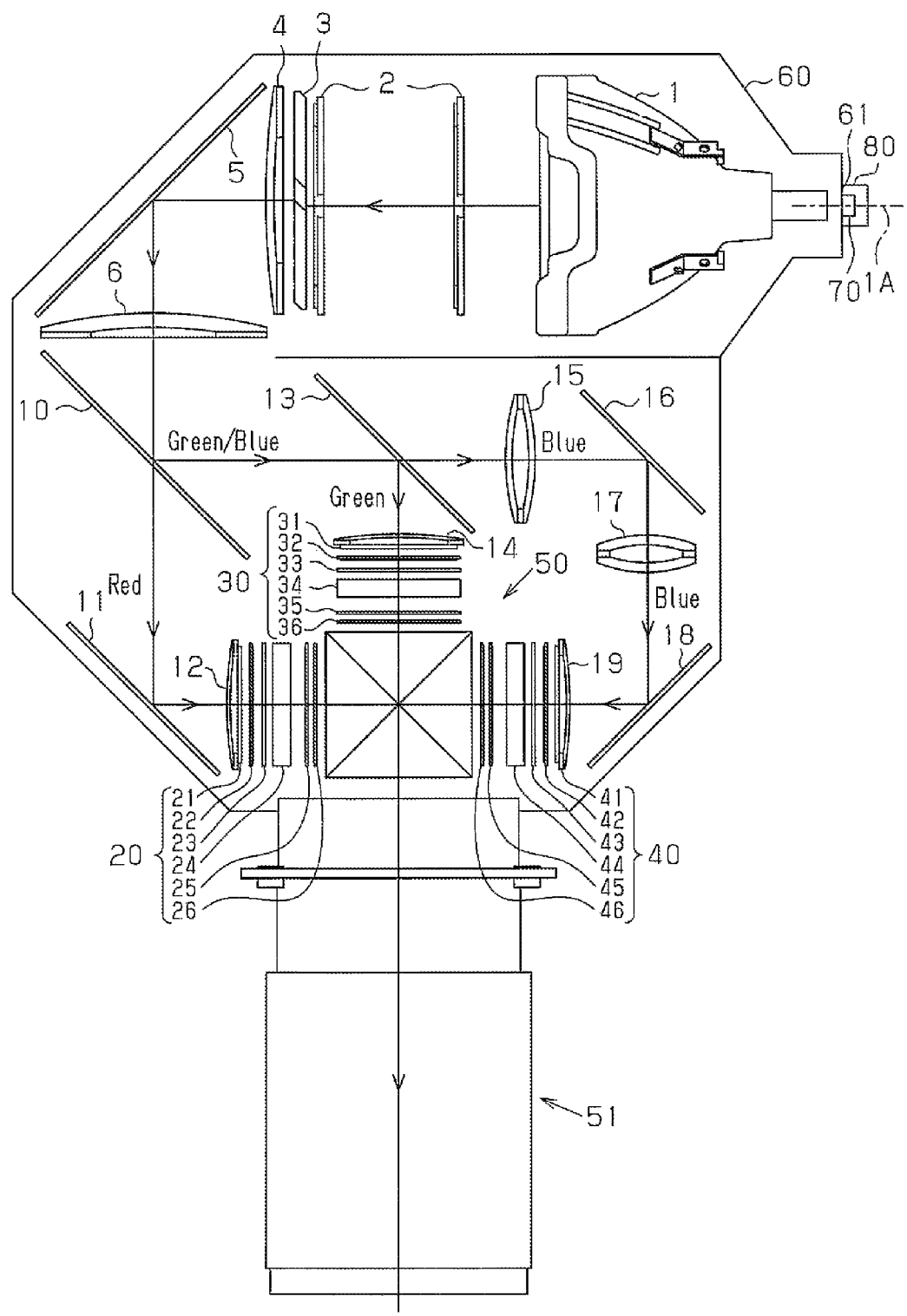
FIG. 2 is a schematic diagram of an optical system for a video projector according to one embodiment of the present invention.

An optical system of a video projector, which includes a structure for mounting a temperature sensor according to one embodiment of the present invention, will now be discussed with reference to FIG. 2.

A lamp 1 serving as a light source is housed in a lamp housing 60. A discharge lamp, such as a metal halide lamp or a super-high pressure mercury lamp, is used as the lamp 1 (light emitting body). The light of the lamp 1 is converted to parallel light by a reflector before being emitted from the lamp 1. The light emitted from the lamp 1 is transferred from an integrator lens 2, a polarization converter 3, a condenser lens 4, a reflection mirror 5, a relay lens 6, and to a first dichroic mirror 10. The integrator lens 2 includes two groups of lenses (fly's eye lens), in which each lens is formed to guide the light emitted from the lamp 1 to the entire surface of red, green, and blue liquid crystal light bulbs 20, 30, and 40, which will be described later. This averages luminance differences in parts of the light emitted from the lamp 1 and reduces the difference in the light amount between a central portion and peripheral portion of a screen.

The first dichroic mirror 10 transmits red light components, while reflecting and separating green and blue light components. Red light components are guided by a reflection mirror 11 and a condenser lens 12 to the red liquid crystal light bulb 20. The separated green light components and blue light components strike a second dichroic mirror 13, which reflects and separates the green light components and transmits the blue light components. The green light components are guided by a condenser lens 14 to the green liquid crystal light bulb 30, and the separated blue light component is guided by a relay lens 15, a reflection mirror 16, a relay lens 17, a reflection mirror 18, and a condenser lens 19 to the blue liquid crystal light bulb 40. The red liquid crystal light bulb 20, the green liquid crystal light bulb 30, and the blue liquid crystal light bulb 40 respectively include inorganic polarization plates 21, 31, and 41, entrance side polarization plates 22, 32, and 42, optical compensation plates 23, 33, and 43, liquid crystal panels 24, 34, and 44, pre-polarization plates 25, 35, 45, and exit side polarization plates 26, 36, and 46. The red light, the green light, and blue light modulated by the liquid crystal light bulbs 20, 30, and 40 are combined by a cross dichroic prism 50 and then emitted to a projection optical system 51.

Figure 3:
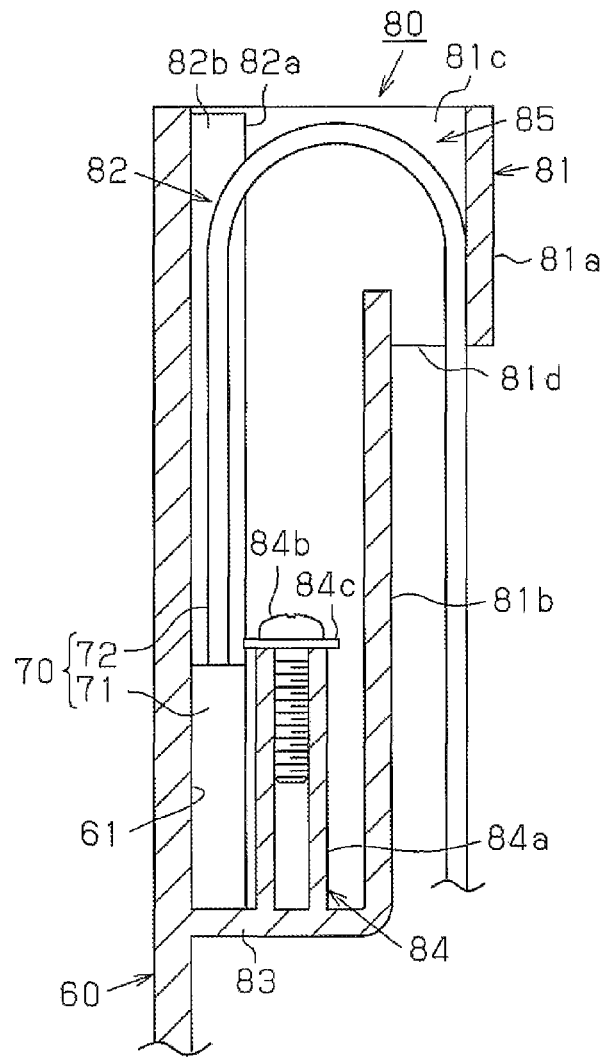
FIG. 3 is a cross-sectional side view showing a mounting unit for a temperature sensor in the video projector of FIG. 1.
Figure 4:
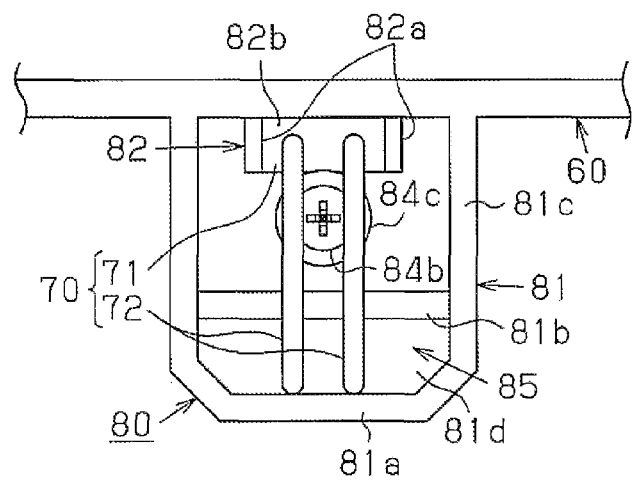
FIG. 4 is a plan view showing the mounting unit of FIG. 3.

A structure for mounting a temperature sensor 70, which detects the temperature of a wall surface, used in such an optical system will now be discussed with reference to FIGS. 2 to 5. FIG. 3 is a cross-sectional side view of a mounting unit 80 for the temperature sensor 70. FIG. 4 is a plan view showing the mounting unit 80. FIG. 5 is a perspective view showing the mounting unit 80 and indicating a mounting position for a main body 71 of the temperature sensor 70 and the state of lead wires 72 extending from the temperature sensor 70.

The mounting structure (mounting unit 80) for the temperature sensor 70 in this embodiment is arranged in a lamp housing (hereinafter simply referred to as the housing) 60 of the optical system of FIG. 2. The mounting unit 80 may be formed on the wall surface of the housing 60 at the rear side of the lamp 1. Accordingly, the temperature sensor 70 uses part of the housing 60 as a temperature-detected wall surface (hereinafter simply referred to as the wall surface) 61. The wall surface 61 is set at a position located along an optical axis 1A of the lamp 1 that is extended toward the rear. The mounting unit 80 is formed so that the temperature sensor 70 detects the temperature of the wall surface 61. The housing 60 is a resin molded product, and the temperature of the wall surface of the housing 60 rises when a cooling fan of the optical system stops operating or when an air intake port is clogged. When the temperature of the wall surface 61 of the housing 60 becomes higher than or equal to a predetermined temperature, the temperature sensor 70 detects the temperature and turns off the lamp 1.

The temperature sensor 70 is a typical thermostat, which is formed to detect the temperature of the wall surface, and includes the main body 71 and the lead wires 72. The main body 71 has an overall shape of a rectangular cuboid. More specifically, the sides extending in one direction are smaller than the sides extending in another direction in each surface of the main body 71. One of the six surfaces of the main body 71 (a larger one of the surfaces) serves as a temperature detection surface used to detect the temperature of the wall surface 61.

The mounting unit 80 for the temperature sensor 70 is integrally molded from a resin with the housing 60, which includes the wall surface 61. The mounting unit 80 includes a peripheral wall 81, which projects from the wall surface of the housing 60 so as to surround the mounted temperature sensor 70. The mounting unit 80 also includes a groove 82, a support 83, and a stopper 84, which are used to mount the main body 71 of the temperature sensor 70 onto the housing. The mounting unit 80 further includes a wire bender 85, which bends the lead wires 72.

The peripheral wall 81, which forms the shape of an overall hollow box having a tetragonal cross-section, is formed so that its upper portion is more projected from the wall surface of the housing 60 than its lower portion. More specifically, the peripheral wall 81 includes an upper rear wall 81a and a lower rear wall 81b. The upper rear wall 81a is located farther from the housing 60 than the lower rear wall 81b. The lower rear wall 81b has an upper portion that is overlapped with the lower portion of the upper rear wall 81a. The two rear walls 81a and 81b are connected to each other only by side walls 81c. The lower portion of the upper rear wall 81a has a portion that extends downward from the upper end of the lower rear wall 81b. This portion forms an opening 81d. The lead wires 72 of the temperature sensor 70 extend out of the mounting unit 80 through the opening 81d. The two corners of the upper rear wall 81a, which opposes the wall surface 61 of the housing 60, are chamfered (see FIG. 4).

The groove 82 allows the main body 71 of the temperature sensor 70 to slide into the mounting unit 80 to a predetermined position along the wall surface 61 of the housing 60 from the upper end of the housing 60. The groove 82 includes two guide walls 82a, each having a uniform width from its upper end to its lower end. The upper end of the groove 82 defines an inlet 82b. The two guide walls 82a are formed so that the distance therebetween is substantially the same as the width of the main body 71 and the height of each guide wall 82a from the wall surface 61 is substantially the same as the thickness of the main body 71.

The support 83 supports the distal end (lower surface) of the main body 71 when the temperature sensor 70 is inserted into the groove 82. The support 83 is formed by a horizontal wall extending from the wall surface of the housing 60 at the lower end of the groove 82. The support 83 serves as the bottom surface of the peripheral wall 81.

The stopper 84 prevents the main body 71, which is inserted into the groove 82, from being separated from the wall surface of the lamp housing 60 and falling out of the groove 82. The stopper 84 also prevents upward movement of the main body 71. The stopper 84 includes a screw seat 84a, a screw 84b, and a washer 84c. The screw seat 84a is cylindrical and projects upward from the support 83. A hole is formed in the center of the screw seat 84a to receive a self-tapping screw. Accordingly, the screw 84b is a self-tapping screw that is fastened to the screw seat 84a. The washer 84c is held between the head of the screw 84b and the upper surface of the screw seat 84a. The screw seat 84a is arranged at a position corresponding to the middle of the groove 82 in the widthwise direction as viewed from the upper surface of the screw seat 84a. The outer surface of the screw seat 84a is spaced apart from the guide walls 82a. In other words, the distance between the wall surface 61 and the outer surface of the screw seat 84a is set to be slightly larger than the thickness of the main body 71. The screw seat 84a serves as a wall facing the groove 82. The washer 84c is preferably formed from a resin and is preferably formed integrally with the screw 84b before the screw 84b is fastened to the screw seat 84a.

The upper surface of the screw seat 84a is slightly higher than the upper surface of the main body 71, which is arranged at the predetermined position in the groove 82. Thus, the lower surface of the washer 84c is located above the main body 71 when the screw 84b is fastened to the screw seat 84a with the washer 84c located in between. Accordingly, when the main body 71 of the temperature sensor 70 is inserted into the groove 82 and located at the vicinity of the predetermined position, the main body 71 is not separated from the wall surface 61 and does not fall out of the groove 82. After the fastening of the screw 84b, the washer 84c restricts upward movement of the main body 71. As described above, the upper surface of the screw seat 84a is slightly higher than the upper surface of the main body 71. In this structure, the elastic force of the lead wires 72, which are bent, press the main body 71 against the wall surface 61. When the screw 84b is fastened to the screw seat 84a to press the main body 71 from above against the support 83, the screw 84b and the screw seat 84a may fix the temperature detection surface of the main body 71 to the wall surface 61 in a state in which the main body 71 fails to contact the wall surface 61. In such a case, the contact failure cannot be corrected by the elastic force of the lead wires 72.

The lead wires 72 extend out of the inlet 82b of the groove 82 and are forcibly bent by the wire bender 85 into a U-shape so that the lead wires 72 extend parallel to the wall surface 61. The bending of the lead wires 72 produces an elastic force that presses the temperature detection surface of the main body 71 against the wall surface 61. The bent lead wires 72 extend out of the opening 81d. The force pressing the temperature detection surface (main body 71) against the wall surface 61 may be adjusted by changing the distance from the upper surface of the main body 71, from which the lead wires 72 extends out, to the upper rear wall 81a of the peripheral wall 81. The pressing force may also be adjusted by changing the position of the upper end of the lower rear wall 81b. Alternatively, the pressing force may be adjusted by changing the position at which the opening 81d is formed between the upper rear wall 81a and the lower rear wall 81b. These adjustment methods may be used in combination to apply a suitable elastic force to the main body 71 within the peripheral wall 81. In the present invention, the wire bender 85 refers to a structure implementing such a function for pressing the main body 71 against the wall surface 61 with the lead wires 72.

The mounting of the temperature sensor 70 onto the housing 60 with the mounting unit 80 will now be discussed.

First, the main body 71 of the temperature sensor 70 is inserted into the groove 82 from the inlet 82b, which is located at the upper end of the housing 60. The main body 71 is arranged at a position in which the distal end (lower surface) of the main body 71 comes into contact with the support 83 (horizontal wall portion). The screw 84b is then fastened to the screw seat 84a with the washer 84c arranged in between. The wire bender 85 bends the lead wires 72, which extend from the upper surface of the main body 71 of the temperature sensor 70, away from the wall surface of the housing 60 into a U-shape. In other words, the lead wires 72, which are connected to the main body 71, extend upward in the groove 82 and are bent into a U-shape towards the rear within the upper part of the peripheral wall 81. The bent lead wires 72 then extend along the upper rear wall 81a and out of the opening 81d. Thus, the elastic force of the lead wires 72 is applied to the main body 71, and the main body 71 is pressed against the wall surface 61. This completes the mounting of the temperature sensor 70.

The mounting structure, or mounting unit 80, for mounting the temperature sensor 70 onto the housing and the video projector using the mounting unit 80 in the present embodiment has the advantages described below.

(1) The main body 71 of the temperature sensor 70, which is inserted into the groove 82, slides along the groove 82 to the predetermined position. This facilitates the mounting of the temperature sensor 70.

(2) The lead wires 72 of the temperature sensor 70 extend through the wire bender 85. As a result, the elastic force of the lead wires 72 presses the main body 71 of the temperature sensor 70 against the wall surface 61. Accordingly, there is no need to use a discrete sensor fastening plate like in the prior art. Thus, the temperature detection accuracy is not lowered like in the prior art.

(3) The wall surface 61, the groove 82, and the support 83 are molded integrally from a resin. Thus, a satisfactory temperature detection accuracy of the wall surface 61 is obtained, and the structure is simplified.

(4) The wire bender 85 is molded integrally with the wall surface 61, the groove 82, and the support 83 from a resin. This keeps a constant positional relationship for the main body 71 of the temperature sensor 70 and the U-shaped bent portion of the lead wires 72. Thus, a stable force presses the main body 71 of the temperature sensor 70 against the wall surface 61 with the lead wires 72. This stabilizes the temperature detection accuracy.

(5) The stopper 84 includes the screw seat 84a, which is parallel to the temperature-detected wall surface 61, the screw 84b, which is fastened to the screw seat 84a, and the washer 84c, which is arranged between the screw seat 84a and the head of the screw 84b. The screw seat 84a serves as a wall facing the groove 82 into which the main body 71 of the temperature sensor 70 is inserted. The washer 84c restricts movement of the main body 71 of the temperature sensor 70 towards the inlet 62b. The stopper 84 simplifies the structure of the groove 82. Further, the stopper 84 simplifies the structure for restricting movement of the main body 71 of the temperature sensor 70 towards the inlet 82b. The upper surface of the screw seat 84a is just slightly higher than the upper surface of the main body 71 when the temperature sensor 70 is arranged at the predetermined position. Thus, the screw seat 84a does not interfere with the elastic force transmitted from the bent lead wires 72 to the main body 71.

(6) The screw seat 84a, which comes into contact with the main body 71 of the temperature sensor 70, is molded from a resin integrally with the wall surface 61, the groove 82, the support 83, and the wire bender 85. The resin screw seat 84a improves the temperature detection accuracy. Further, since the components of the mounting unit 80 for the temperature sensor 70 are formed integrally, the structure of the mounting unit 80 is further simplified.

(7) The washer 84c, which may come into contact with the main body 71 of the temperature sensor 70, is formed from a resin. This improves the temperature detection accuracy.

(8) The video projector of the present embodiment uses the mounting unit 80 for the mounting of the temperature sensor 70. This improves the temperature detection accuracy and simplifies the structure for mounting the temperature sensor 70.

(9) In the video projector of the present embodiment, the wall surface 61 is set at a position located along an optical axis 1A of the lamp 1 that is extended opposite to the direction in which light is emitted from the lamp 1. Thus, the temperature of the wall surface 61 is accurately detected regardless of the state in which the temperature sensor 70 is mounted on the video projector.

It should be apparent to those skilled in the art that the present invention may be embodied in many other specific forms without departing from the spirit or scope of the invention. Particularly, it should be understood that the present invention may be embodied in the following forms.

The mounting structure (mounting unit 80) for the temperature sensor 70 does not necessarily have to be arranged on the wall surface 61 of the housing 60. For example, the mounting unit 80 may be applied to detect the temperature of the wall surface of a holder holding any one of the inorganic polarization plates 21, 31, and 41, the entrance side polarization plates 22, 32, and 42, the optical compensation plates 23, 33, and 43, the pre-polarization plates 25, 35, and 45, and the exit side polarization plates 26, 36, and 46 in the above-described embodiment. In such a case, the mounting of the temperature sensor 70 is facilitated, and the temperature detection accuracy is improved.

The screw seat 84a, which forms the stopper 84, is cylindrical. However, the screw seat 84a may have any shape. For example, the screw seat 84a may have a square horizontal cross-section.

The washer 84c, which forms the stopper 84, is formed from a resin. However, the washer 84c may be formed from a metal. This slightly decreases the temperature detection accuracy since heat is conducted to the metal washer 84c and radiated into the ambient air.

The lead wires 72 of the temperature sensor 70 extend through a predetermined part of the wire bender 85. This bends the lead wires 72 into a U-shape, and the elastic force produced by the bending of the lead wires 72 act on the main body 71. The wire bender 85 is not limited to such a structure and may take any form as long at it functions in the same manner.

The present examples and embodiments are to be considered as illustrative and not restrictive, and the invention is not to be limited to the details given herein, but may be modified within the scope and equivalence of the appended claims.

What is claimed is:

1. A mounting structure for mounting a temperature sensor, the mounting structure comprising:
a temperature sensor comprising a main body having a temperature detection surface and a lead wire connected to the main body; and
a housing in which the temperature sensor is inserted, the housing comprising:

a wall surface, said wall surface defining a groove and including an inlet in which the temperature sensor is inserted, wherein,
when the temperature sensor is inserted in the housing, the temperature detection surface is configured to detect a temperature of the wall surface, and
when the temperature sensor is inserted in the housing, the lead wire of the temperature sensor extends out of the inlet;
a support which supports the main body of the temperature sensor when the temperature sensor is inserted in the housing;
a wire bender portion which bends the lead wire of the temperature sensor extending out of the inlet into a U-shape, when the temperature sensor is inserted in the housing, so that the lead wire is parallel to the wall surface in order to press the temperature detection surface of the temperature sensor against the wall surface with an elastic force of the lead wire that is produced when the lead wire is bent; and
a stopper which restricts movement of the main body of the temperature sensor towards the inlet when the temperature sensor is inserted in the housing.

2. The mounting structure according to claim 1, wherein the wall surface, the groove, and the support are molded integrally from a resin.

3. The mounting structure according to claim 2, wherein the wire bender is integrally molded from the resin with the wall surface, the groove, and the support.

4. The mounting structure according to claim 1, wherein the stopper includes:
a screw seat that is parallel to the wall surface, a screw fastened to the screw seat and having a head; and
a washer arranged between the screw seat and the head of the screw; wherein the screw seat forms a wall that faces the groove, into which the temperature sensor is inserted, and the washer restricts movement of the main body of the temperature sensor towards the inlet.

5. The mounting structure according to claim 4, wherein the screw seat is integrally molded from the resin with the wall surface, the groove, the support, and the wire bender.

6. The mounting structure according to claim 5, wherein the washer is formed from a resin.

7. The mounting structure according to claim 5, wherein the washer is formed integrally with the screw.

8. The mounting structure according to claim 1, wherein the mounting structure is applied to a video projector including a housing, which houses a lamp, the wall surface being part of the housing.

9. The mounting structure according to claim 1, wherein the mounting structure is applied to a video projector including a liquid crystal light bulb, the liquid crystal light bulb including a polarization plate and a polarization plate holder, which holds the polarization plate, and the wall surface being part of the polarization plate holder.

10. The mounting structure according to claim 1, wherein the main body of the temperature sensor is accommodated in an area surrounded by the wall surface, the groove, and the stopper, with the stopper including a washer spaced from the main body accommodated in the area.

11. The mounting structure according to claim 1, wherein the wire bender includes: two side walls projecting from the wall surface; and a first rear wall coupled to the two side walls, wherein the temperature detection surface of the main body is pressed against the wall surface by the elastic force acting in a direction opposite to the direction in which a force produced by the bent lead wire presses the first rear wall.

12. The mounting structure according to claim 11, wherein the wire bender further includes: a second rear wall coupled to the two side walls and located closer to the wall surface than the first rear wall, and the bent lead wire extends out from between the first rear wall and the second rear wall.

13. A video projector comprising:
a lamp;
a liquid crystal light bulb which receives light from the lamp;
a housing which houses the lamp; and
a temperature sensor comprising a main body having a temperature detection surface and a lead wire connected to the main body;
a mounting unit for housing the temperature sensor, the mounting unit comprising:
a wall surface forming a groove having an inlet in which the temperature sensor is inserted such that said temperature sensor detects a temperature of the wall surface when in contact with the wall surface and such that the lead wire of the temperature sensor extends out of the inlet;
a support which supports the main body of the temperature sensor;
a wire bender which bends the lead wire of the temperature sensor extending out of the inlet into a U-shape so that the lead wire is parallel to the wall surface in order to press the temperature detection surface of the temperature sensor against the wall surface with an elastic force of the lead wire that is produced when the lead wire is bent; and
a stopper which restricts movement of the main body of the temperature sensor towards the inlet.

14. The video projector according to claim 13, wherein the wall surface of the housing that comes into contact with the temperature sensor is located rearward from the lamp and extends perpendicular to an optical axis of the lamp.

15. A mounting structure for mounting a temperature sensor, the mounding structure comprising:
a wall surface defining a groove and including an inlet for accommodating insertion of a temperature sensor;
a support which is configured to support a main body of the temperature sensor; and
a wire bender portion which is configured to bend a lead wire of the temperature sensor extending out of the inlet into a U-shape so that the lead wire is parallel to the wall surface in order to press the temperature detection surface of the temperature sensor against the wall surface with an elastic force of the wire that is produced when the lead wire is bent; and
a stopper which is configures to restrict movement of the main body of the temperature sensor towards the inlet.

* * * * *